United States Patent

[11] 3,623,678

[72] Inventors Robert W. Housman
Winthrop;
Koichiro Hori, Melrose, both of Mass.

[21] Appl. No. 799,669
[22] Filed Feb. 17, 1969
[45] Patented Nov. 30, 1971
[73] Assignee Automatic Radio Manufacturing Company, Inc.
Melrose, Mass.

[54] CASSETTE TAPE PLAYING
11 Claims, 8 Drawing Figs.

[52] U.S. Cl. .................................................... 242/198, 242/201, 274/4 E
[51] Int. Cl. ................................................ G11b23/10, G11b 15/66
[50] Field of Search ............................................ 242/180, 181, 197, 198, 199, 200; 274/4, 11; 179/100.22; 352/72, 78

[56] References Cited

UNITED STATES PATENTS

| | | | |
|---|---|---|---|
| 3,167,267 | 1/1965 | Crane | 242/198 |
| 3,395,871 | 8/1968 | Ackermann et al. | 242/198 |
| 3,417,938 | 12/1968 | Markakis et al. | 242/200 |
| 3,429,519 | 2/1969 | Staar | 242/200 |
| 3,494,572 | 2/1970 | Uemura | 274/11 C |

*Primary Examiner*—George F. Mautz
*Attorney*—Wolf, Greenfield & Sacks

ABSTRACT: A cassette tape player, especially suitable for use in a vehicle, includes a cartridge guide assembly formed with a generally rectangular insertion opening for receiving a cassette that is inserted in a direction that has a horizontal and slight upward component and then guides the cassette downward into registration with the mechanism that drives and effects scanning of the magnetic tape. The invention includes a relatively simple mechanism for shifting among the different functions, such as play, fast forward and fast reverse.

INVENTORS
Robert W. Housman
BY Koichiro Hori
Wolf, Greenfield, Hieken & Sacks
ATTORNEYS INVENTORS
Robert W. Housman
BY Koichiro Hori
Wolf, Greenfield, Hieken & Sacks
ATTORNEYS INVENTORS
Robert W. Housman
BY Korchiro Hori
Wolf, Greenfield, Hieken & Sacks
ATTORNEYS INVENTORS
Robert W. Housman
Kachiro Hori
BY Wolf, Greenfield, Hieken & Sacks
ATTORNEYS

CASSETTE TAPE PLAYING

BACKGROUND OF THE INVENTION

The present invention relates in general to cassette tape players and more particularly concerns a novel cassette tape player especially suitable for vehicles where insertion of the cassette in a generally horizontal direction beneath the dashboard is especially desirable. The invention is characterized by relatively simple mechanisms to accomplish this result and additional functions related to shifting between such functions as fast forward, rewind and play.

Vehicular tape-playing systems have met with wide acceptance because of the high quality of sound reproduction provided of program material selected by the listener. Because of the significant, commercial demand for improved vehicular tape-playing systems, there is an ever-increasing need for more efficient and better designed systems for such use. Of some importance in tape-playing systems used in vehicles, is the provision of a system which the vehicular operator can handle with minimum distraction from the operation of the vehicle. In this connection, it is important to provide a system in which an operator may easily insert a tape cassette, remove it, turn it to play, rewind it, or advance it on a fast-forward or fast-reverse basis.

SUMMARY OF THE INVENTION

It is therefore an object of the present invention to provide a tape-player system designed especially for use in vehicles in which cassettes may be easily inserted and removed and registered with an operating mechanism without visual guidance. A further object of the present invention is to provide an improved tape-player system designed for simple shifting between functions, such as fast forward, fast reverse and play.

In the present invention there is provided a cassette tape player having a means for receiving a cassette in a first position, preferably inclined with respect to the horizontal; together with means responsive to the presence of a cassette in this first position for moving the cassette to a second position wherein further means responsive to the cassette in the second position interengages the tape of the cassette with the signal-transmitting means of the tape player. Means are provided at the second position for driving the tape in the cassette preferably at selective fast-forward, fast-reverse and play speeds.

BRIEF DESCRIPTION OF THE DRAWINGS

The foregoing objects and advantages of the present invention will be more clearly understood when considered in conjunction with the accompanying drawings in which.

DESCRIPTION OF THE PREFERRED EMBODIMENTS

Figure 1:
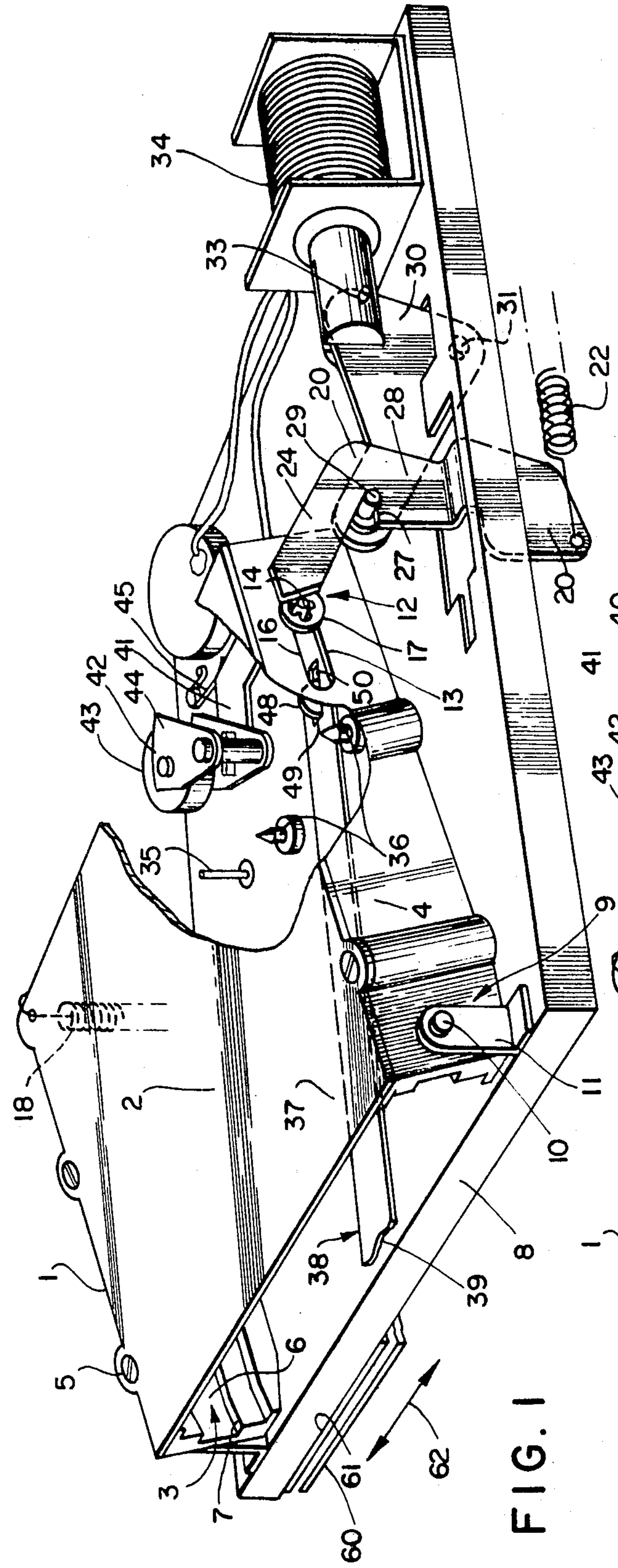
FIG. 1 is a fragmentary, perspective view of a cassette tape player embodying the present invention in a position to receive a cassette.
Figure 2:
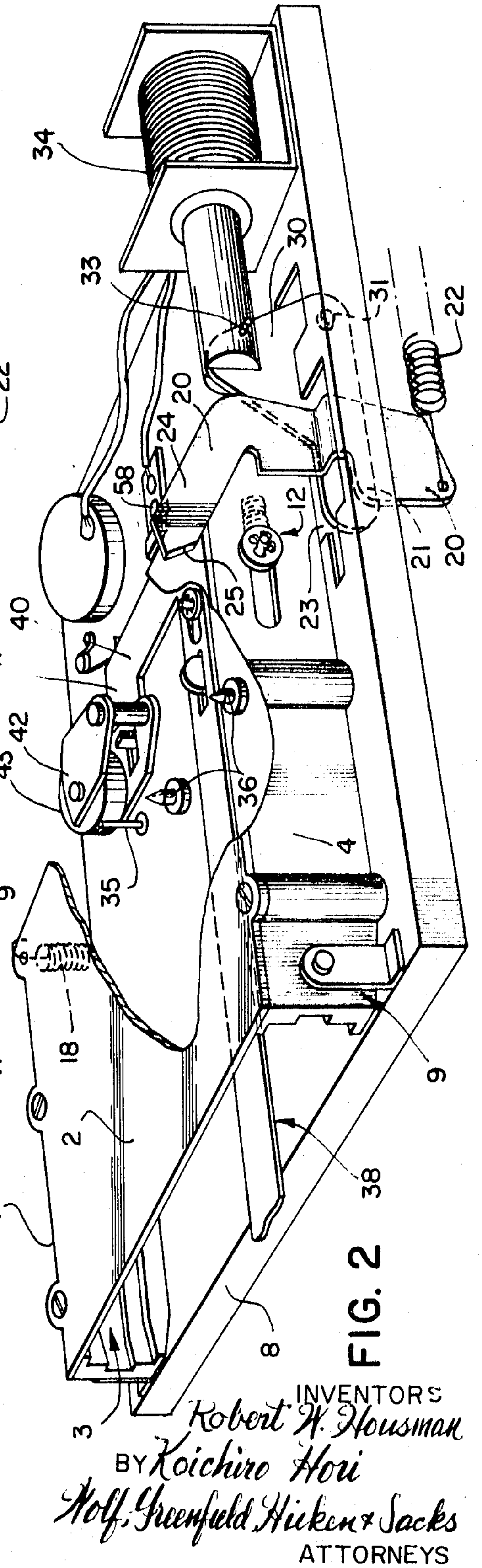
FIG. 2 is a fragmentary, perspective view of the player of FIG. 1 in a position in which a cassette has been received but without the cassette actually illustrated.

Referring to FIGS. 1 and 2, there is illustrated perspective views of the cassette tape player in an eject and idle position in FIG. 1; and in a play position in FIG. 2. In this arrangement there is provided a means for receiving a cassette. This means comprises a housing 1 having top and sidewalls 2, 3 and 4 which are suitable secured together as, for example, by screws 5. The sidewalls are provided with inner surfaces designed to receive and engage the sidewalls of the tape cassette. Suitable, longitudinal channels 6 are provided for this purpose and are designed to support and secure the cassette in facing relation with the inner surface of the top 2. The rear ends of the walls 3 and 4 may be provided with suitable, diverging bevels 7 at the ends of the channels or grooves 6, to assist guiding the cassette into the player. The housing 1 is supported on a frame or base 8 at its rear end by pivot means generally illustrated at 9, which may comprise axially aligned pins 10 journaled in a support 11 and pivotally supporting the housing for movement from a position as illustrated in FIG. 1 to a position as illustrated in FIG. 2. The housing 1 is thus capable of moving from a slightly inclined position with respect to the horizontal, as illustrated in FIG. 1, to a second position parallel with the upper surface 11 of the base means, as illustrated in FIG. 2. The housing 1 is provided with means 12 for ejecting the cassette cartridges. This cartridge-ejector assembly means 12 comprises a pair of assemblies positioned one on each of the inner surfaces of the sidewalls 3 and 4. One such assembly is illustrated in FIG. 1, with the other assembly similar in configuration. In this arrangement, a slot or groove 13 is formed on the inner surface or through the wall 4, and is designed to receive and secure for sliding movement forwardly and rearwardly with respect to the direction of insertion of a cassette, a pin 14. This pin 14 projects into the housing and is adapted to be engaged by the forward end of a cassette when inserted in the housing. The pin 14 is spring loaded by spring 16 in a rearward direction with the spring 16 having sufficient force to eject a cartridge unless positively held within the housing 1 by locking means hereafter described. The spring 16 may be suitably secured at one end to the pin, and at the other end to the housing. The pin 14 is provided with a boss or head 17 that extends to the outer surface of the sidewalls.

The housing 1 is normally spring loaded by suitable means, such as spring 18, to bias it from a first position illustrated in FIG. 1, to the second position as illustrated in FIG. 2. This spring means 18 may comprise a helical spring secured at its upper end to a flange or lip formed on the top 2 of the housing 1, with the lower end of the spring 18 connected to the base 8.

Means are provided in the player that are responsive to the presence of a cassette in the housing when in the position of FIG. 1 for moving the cassette and the housing from the position of FIG. 1 to the position of FIG. 2. In this arrangement, there is provided a locking arm 20. This locking arm is pivotally secured to the base 8 by a pin 21. The lower end of the locking arm 20 projects downwardly beneath the base 8 where it is spring tensioned by helical spring 22 secured at one end to the base 8 or other suitable stationary means, and at the other to the locking arm 20. This spring thus normally biases the locking arm 20 in a counterclockwise position, as illustrated in FIGS. 1 and 2. The upper end of the locking arm 20 projects through a suitably shaped slot 23 in the base 8, and as inclined forwardly in a leg 24 with an edge 25 adapted to be engaged by the head 17 of the pin 14. A locking recess 27 is positioned at the junction of the inclined leg 24 and the vertical leg 28 of the locking arm 20. This locking recess 27 on the rear edge of the locking arm 20 is designed to receive a pin 29, in turn projecting from the ejection lever 30. Ejection lever 30 is pivotally supported by a pin, not shown, but located at 31, as illustrated in FIGS. 1 and 2, that pivotally supports the ejection lever on the base 8. This ejection lever 30 is pivotally secured at one end to the operating arm 33 of the solenoid 34, in turn supported on the base 8. The other end of the ejection lever 30 has the pin 29 projecting laterally from it and adapted to be engaged by the locking recess 27 when the unit is in an eject or idle position, as illustrated in FIG. 1.

Projecting upwardly from the upper surface 11 of the base 8 is a capstan 35 adapted to be inserted in a cassette for driving the drive mechanism or roll of the cassette. Also projecting upwardly from surface 11 are a plurality of guide pins 36 adapted to interlock with a cassette when the cassette is in the second position as illustrated in FIG. 2. These pins 36 are designed to secure the cassette in the housing 1 against ejection by the cartridge-ejection assembly means 12.

An ejection-slide assembly 37 is positioned over the surface 11 of the base and is supported for sliding movement in a forward direction towards the right of FIG. 1 and in a rearward direction to the left of FIG. 1. Suitable means which may, for example, comprise flanges or limiting bosses may be provided to secure this slide assembly against removal while permitting its forward and reverse movement as described. The assembly 37 includes a slide 38 which consists essentially of an elongated arm which is adapted to project rearwardly outside of the housing 1 at 39 for manual engagement. The other end of the slide is provided with a laterally extending leg 40 terminating in a support platform 41. Suitably secured to the support platform 41 is a pressure-roller assembly 42. This pressure-roller assembly 42 includes a pressure wheel 43, adapted to engage one surface of a tape and press it against the drive roll within the cassette. A suitable frame 44 supports the wheel 43 for axial rotation with the frame 44 in turn supported on the platform 41.

The ejection-slide assembly 37 is normally tensioned in a rear direction by suitable spring means which may, for example, comprise a leaf spring 45 of suitable dimensions which is anchored at one end to the base 8 and at the other engages the forward edge of the ejection-slide assembly. This spring tension which may also comprise suitable spring means interconnecting the bases of capstan 35 and platform 41, is normally secured against movement under the force of leaf spring 45 by a sear 48 which projects upwardly through a slot 49 in the leg 38 of the slide assembly 37. This sear 48 is spring tensioned upwardly by a spring beneath the base 8 and not shown, to a position normally illustrated in FIG. 1, in which the forward edge of the sear engages the rear edge 50 of the slot 49, thus limiting rearward movement of the slide assembly 37. The sear projects upwardly and is designed to be engaged by the cassette when the cassette is moved from a first to a second position. Downward movement of the sear thus disengages the forward edge of the sear and the rear edge 50 of the slot, thus permitting the spring 45 to move the ejection-slide assembly rearwardly, carrying the pressure-roller assembly 42 into play position with respect to a cartridge.

The solenoid 34 is actuated by solenoid contacts 58 which are supported on the surface 11 and which are designed to be interengaged and closed by forward movement of the slide 37.

In the operation of the mechanism, as described to this point, a cartridge (not shown) is inserted into the housing 1 by sliding it forwardly from the left—as illustrated in FIG. 1. As the cartridge moves forwardly its forward edge engages the inside end of pins 14, pushing these pins forwardly until the heads 17 engage the end of the legs 24, thus pivoting these legs about the pivot points or pins 21 against the tension spring 22, thereby disengaging the locking recess and pin 29 of the ejection lever 30. When ejection lever 30 is moved from a locking position, the housing 1 is released for movement from the position of FIG. 1 to the position of FIG. 2 under the force of spring means 18. When the cartridge moves to a play position, as illustrated in FIG. 2, the cartridge is interlocked with guide pins 36 and the capstan 35 fits into a drive position in the cassette. At the same time, the bottom surface of the cassette forces the sear 48 down, thus disengaging the slide assembly 37, permitting it to move rearwardly carrying with it the pressure roller assembly 42, thereby engaging the pressure wheel 43 with the outside surface of the tape. This effects the necessary action for driving the tape against the capstan.

When the cassette is to be removed, the operator manually slides or pushes the end 39 of the slide assembly 37 forwardly. This forward movement moves the pressure-roller assembly 42 from the pinching engagement with the tape and capstan, thereby disengaging the tape. Continued movement of the slide 37 by the operator actuates the solenoid contact 48 thereby energizing solenoid 34. When solenoid 34 is energized the ejection lever 30 is pivoted about point 31 from the position of FIG. 2 to the position in FIG. 1, where it is secured in the locking recess 27 by the locking arm 20 which has previously moved to its original position under the tension of spring 22. The pivoting movement of the ejection lever 30 raises the housing 1 from the position of FIG. 2 to the position of FIG. 1, thereby releasing the cassette from the guide pins 36 and the capstan 35. The cartridge-ejector assembly 12 then forces the cassette rearwardly from the housing from whence it may be removed and replaced.

Turning now to the mechanism illustrated in FIGS. 3 to 8, there is shown a means in which a cartridge may be positioned for play, fast forward or rewind. In this arrangement, there is shown a cam plate 60. This cam plate is supported below the base 8 in spaced relation to a mechanism-supporting plate 61. The mechanism-supporting plate 61 is suitably secured to the base 8 by screws or other securing means and is designed to support the various mechanisms hereafter described. The cam plate 60 is supported for movement laterally in a direction of arrows 62, in spaced relation to the plate 61. Suitable means may be provided for supporting the cam plate 60 in this spaced sliding relationship to the plate 61. These means may comprise, for example, suitable detenting angle members at the side edges of the cam plate 60, which function both to support and guide the plate 60. In addition, a suitable control mechanism should be provided for lateral movement of the cam plate 60 from the rear of the player so that an operator may manually control the position of the plate. Such means, for example, may comprise a stationary, mounted knob having a depending lever adapted to engage by direct linkage or leverage action projecting elements for such reciprocating movement.

Figure 3:
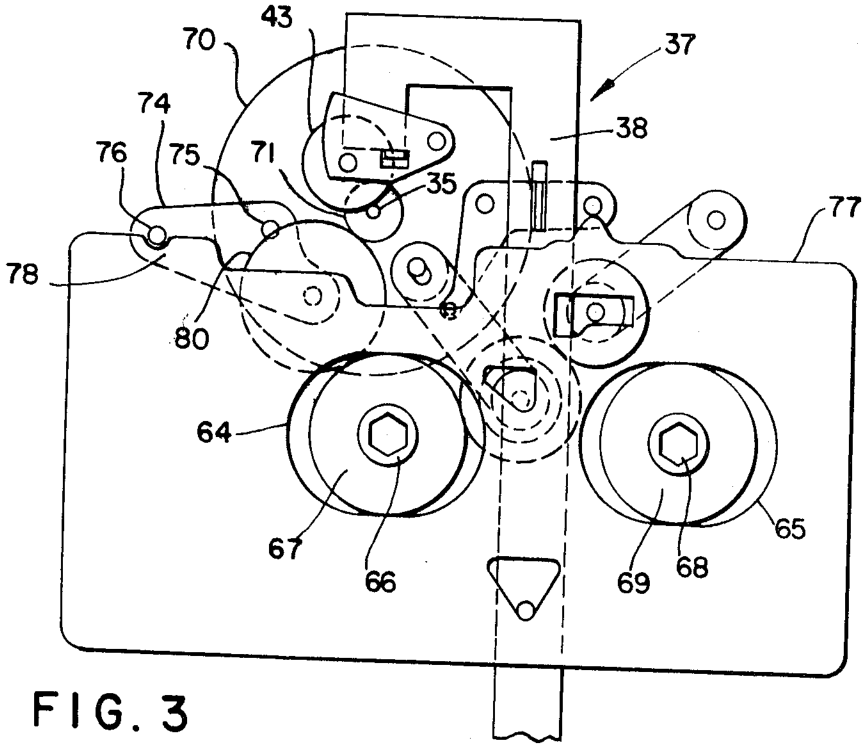
FIG. 3 is a top plan view with portions removed of a mechanism of the invention used for shifting between the different functions, with the mechanism shown in a play position.
Figure 4:
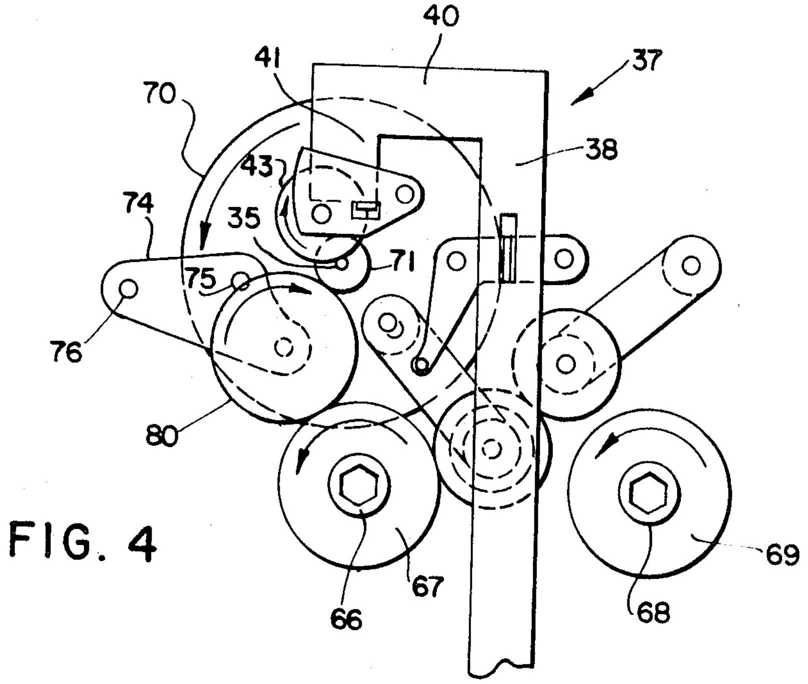
FIG. 4 is a view similar to FIG. 3 with elements removed for clarity.

Referring first to FIGS. 3 and 4, there is illustrated the cam plate 60 having large slots 64 and 65 through which the takeup spindle 66 and a clutch 67, key to the spindle 66, project. The takeup spindle 66 designed to engage the takeup reel in the cassette when the cassette is positioned in the play position. The supply spindle 68 and a clutch 69 keyed to it project through slot 65. The clutches 67 and 69 may be friction clutches. A flywheel 70 is axially supported on the mechanism-support plate 61. This flywheel 70 is provided with a cylindrical boss 71 of smaller diameter than the flywheel 70. Also keyed to the flywheel 70 and axial with it is a capstan 35 which projects upwardly through plate 61 and base 8 for interengagement with the drive roll of the cassette when in a play position. A lever 74 is centrally and pivotally supported by pins 75 to the plate 61. One end of this lever carrying a detent 76 adapted to be engaged by the forward edge 77 of the cam plate 60 with the lever movable to and from the position illustrated at FIG. 3 on lateral movement of the cam plate whereby the detent 76 is moved in and out of the cam surface 78 of the edge 77. The other end of this lever 74 has axially mounted on it a drive wheel 80. This drive wheel 80 has a periphery adapted to be moved into tangential interengaging relation with the boss 71 and the friction clutch 67 when the cam plate 60 is positioned in the play position, as illustrated in FIG. 3. Thus, rotation of the flywheel 70 and, consequently its boss 71, will transmit movement through the drive wheel 80 to the takeup clutch 67, and thence to the cassette. In the play position it, will be noted, that the eject-slide assembly 37 is in a position wherein the pressure wheel 43 is substantially in tangential engagement with the capstan 35, thus providing a means for pinching the tape as it moves between these two elements.

Figure 5:
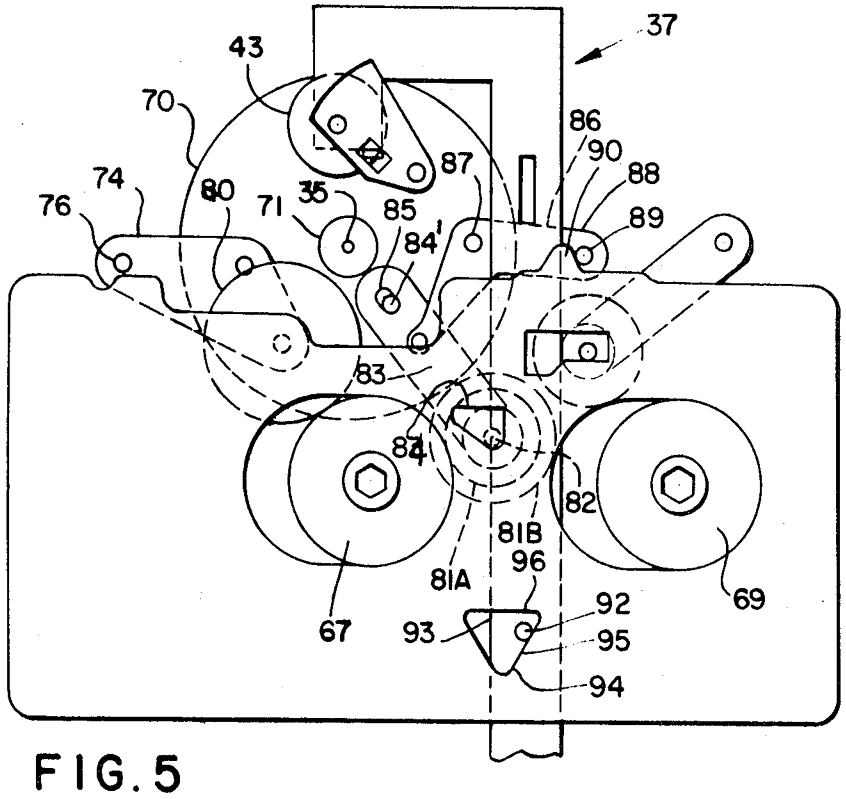
FIG. 5 is a view similar to FIG. 3, but with the mechanism shown in a fast-forward position.
Figure 6:
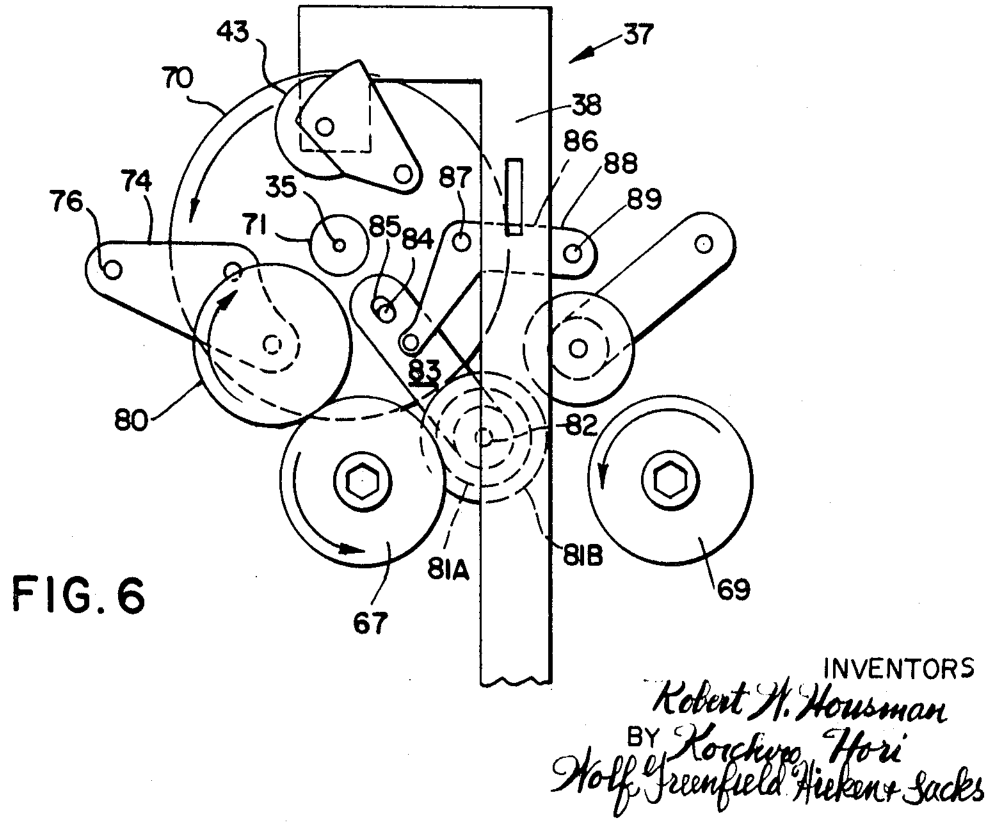
FIG. 6 is a view similar to FIG. 5, but with elements removed for clarity.

When the cam plate is moved by suitable, actuating mechanisms as described above, to a fast-forward position, it is in a position, as illustrated in FIGS. 5 and 6. In this arrangement, commonly mounted drive wheels 81A and 81B respectively engage the periphery of friction clutch 67 and flywheel 70. At the same time, drive wheel 80 is disengaged from engagement with boss 71, thus disengaging the means for driving the spindle 66 in a counterclockwise direction, as illustrated in FIG. 4. The commonly mounted drive wheels 81A and 81B are supported and fixed to shaft 82 in turn mounted on lever 83. Shaft 82 projects through a slot generally triangular in shape as illustrated at 84, in the cam plate. Lever 83 is supported by a pin 84′ in an elongated slot 85 for movement over limited, longitudinal directions. The position of the lever 83 as limited by the length of slot 85, is controlled by lever 86. Lever 86 is mounted on plate 61 by pin 87 for pivoting movement about pin 87. One leg 88 is provided with a boss 89 that is engageable by the detent 90 in the forward edge 77 of the cam plate. In the fast-forward position, the lever 86 by engagement of pin 89 with detent 90, causes the lever 83 to move from the play position in which pin 84′ is at the upper end of slot 85 to a position in which pin 84′ is at the lower end of slot 85. This movement causes drive wheel 81B to engage the periphery of the flywheel 70. As noted in FIG. 3 when in a play position, the drive wheel 81B is out of engagement with flywheel 70. Lateral movement of the cam plate causes the right-hand site of the aperture hole 84 to press the drive wheel 81A into tangential engagement with the friction clutch 67.

When the unit is in a fast-forward position, as illustrated in FIGS. 5 and 6, the ejection-slide assembly is moved forwardly as illustrated. This forward movement disengages the pressure roller or wheel 43 from tangential adjacency with the capstan 35. This movement is effected simultaneously with the lateral movement of the cam plate 60 to the left, as viewed in FIG. 5, by interengagement of pin 92 with the triangular hole 93. Pin 92 projects from the leg 38 into the triangular hole 93. In a normal play position, this pin 92 is at the rear apex 94 of the triangular hole 93. When the unit is being positioned in a fast-forward position, the pin 92 is moved forwardly along edge 95 of the triangular hole 93 toward the corner 96. This movement carries the slide assembly 37 forwardly.

Figure 7:
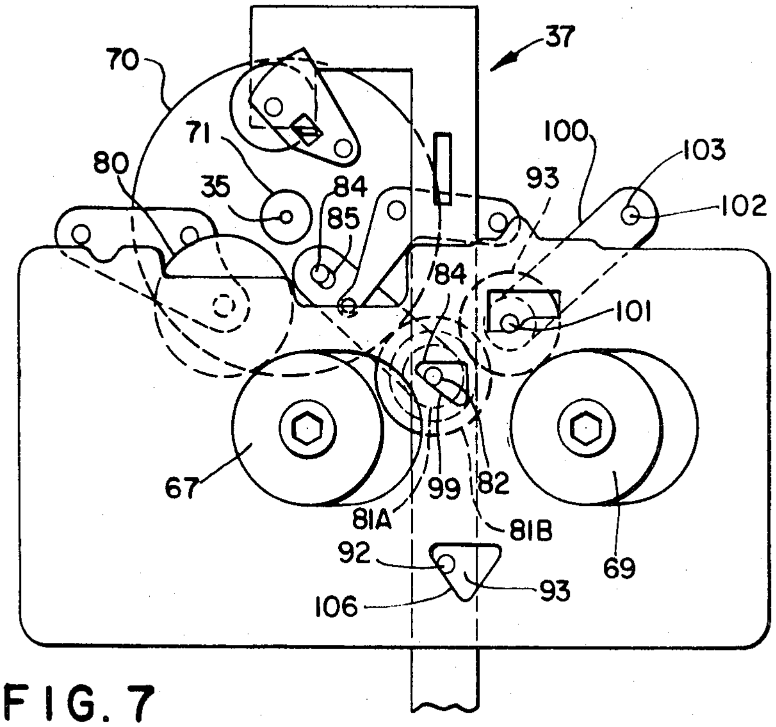
FIG. 7 is a view similar to FIG. 3, but with the mechanism shown in a fast-rewind position.
Figure 8:
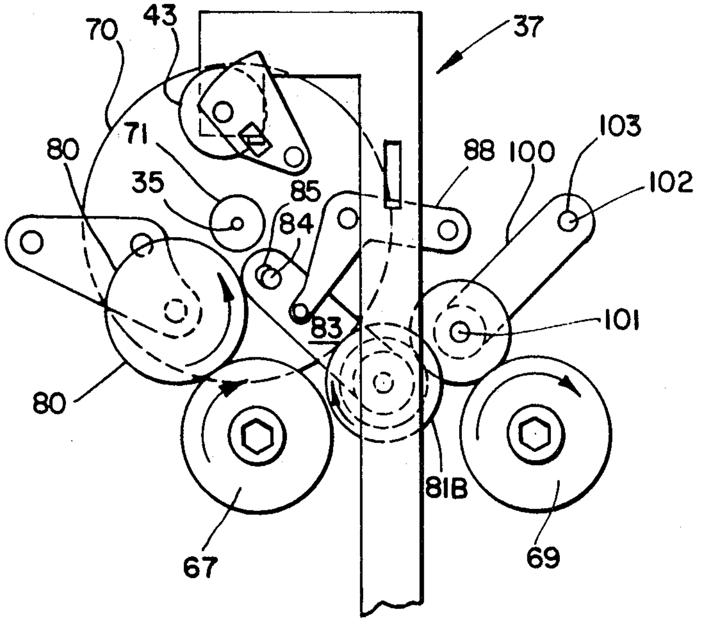
FIG. 8 is a view similar to FIG. 7, but with elements removed for clarity.

When the unit is positioned in a rewind position, the cam plate 60 is moved to the right, as viewed in FIG. 7. In this position the clutches 67 and 69 are aligned with the left side slot 64 and 65 respectively. The slide assembly 37 is in a position similar to the position it assumes in the fast-forward position wherein the boss 71 is remote from the capstan 35. The wheel 80 is also in the same position that it was in when in a fast-forward position in which it is operatively disengaged from the boss 71. The wheels 81A and 81B as well as wheel 98 have assumed different positions. The wheels 81A and 81B are pivoted about pin 84′ which remains at the lower end of slot 85 on movement of the cam plate 60 to the right, as viewed in FIG. 7, by interengagement of pin 82 with the hole 84. The pin 82 moves along edge 99 of the hole 84, thus pivoting the wheels 81A and 81B. On pivoting, wheel 81A disengages from clutch 67 and engages the periphery of wheel 98. Wheel 81B remains, however, in tangential contact with the periphery of the flywheel 70. Wheel 98 is mounted for rotation on pin 101, in turn mounted on lever 100. Lever 100 in turn is supported and secured by pin 102, which passes through the hole 103 at one end of the lever 102. Movement of the cam plate 60 to the right, as illustrated in FIG. 7, causes wheel 81B to engage wheel 98, forcing it against clutch 69 thereby transmitting power from the flywheel through wheel 81B, wheel 81A, wheel 98 and thence to the clutch 69 for a fast rewind. It will be noted in this arrangement the interengagement of pin 92 with side 106 of the triangular hole 93 maintains the slide assembly 37 in a forward position in which the boss 71 is operatively disengaged from spindle 35.

The invention also contemplates a common, actuating lever or knob which will both effect lateral movement of the cam plate 60 and reciprocal forward and rear movement of the slide mechanism 37. Any suitable interlinking means may be used for common actuation to these elements sequentially or selectively.

Components of the player not illustrated may be conventional in design and arrangement. These components, for example, may include a sound transducer head positioned to engage the tape as it is moved by the rotation of the spindle of the pressure wheel. This transducer head may be suitably mounted on the slide 37 for engagement with the tape when the cassette is in its second position.

What is claimed is:

1. In a cassette tape player including pivotal means for receiving a cassette in a first position, means for securing said cassette-receiving means in said first position, means responsive to the presence of a cassette in said first position for disengaging said securing means and pivotally moving said cassette to a second position, means responsive to said cassette in said second position for driving the tape of said cassette, and means positioned to engage said tape of said cassette at said second position for electrical signal transmission.

2. A device as set forth in claim 1 wherein said means for driving the tape of said cassette includes means for selectively driving said tape in a fast-forward, fast-reverse and at play speeds.

3. A device as set forth in claim 1 wherein said driving means includes tape-driving means comprising a spindle, means supporting said spindle for axial rotation in fixed relation to said second position and means for axial rotation of said spindle.

4. A device as set forth in claim 3 wherein said tape-driving means includes a pressure roll assembly and said means responsive to said cassette in said second position includes means supporting said pressure roll assembly for sliding movement to and from a position wherein said pressure roll is operatively engageable with said spindle.

5. A device as set forth in claim 4 including means restraining said supporting means remote from said position wherein said pressure roll is operatively engageable with said spindle until actuated by a cassette in said second position.

6. A device as set forth in claim 5 wherein said means supporting said pressure roll comprises an ejector-slide assembly supported for movement normal to the axis of said spindle.

7. A device as set forth in claim 1 comprising means for moving a cassette from said second position to said first position including a manually actuable means and electromechanical means responsive to movement of said manually actuable means, said electromechanical means including a linkage engageable with said receiving means.

8. A device as set forth in claim 7 wherein said linkage includes operatively interengageable levers with one operatively interengaging a solenoid and said receiving means for moving said receiving means, said other lever engageable with said one lever to lock said one lever while said receiving means in said first position until a cassette is positioned in said first position.

9. A device as set forth in claim 2 wherein said means for selectively driving said tape includes a cam plate, means supporting said cam plate for reciprocal movement, means for supporting a plurality of mechanisms for movement to and from operating positions, said mechanisms including a plurality of drive wheels for selectively engaging means for driving tapes in a cassette in said second position in fast-forward, reverse or play speeds and means for operatively interengaging said cam plate with said mechanisms whereby movement of said cam plate to one of three positions selectively interengage one of said drive wheels for corresponding movement of said tape at said fast-forward, reverse or play speeds.

10. In a cassette tape player including means for receiving a cassette in a first position, means responsive to the presence of a cassette in said first position for moving said cassette to a second position, means responsive to said cassette in said second position for driving the tape of said cassette, means positioned to engage said tape of said cassette at said second position with a transducer means, manually actuable means for ejecting said cassette from said player, said means responsive to the presence of a cassette comprising a linkage disposed adjacent said receiving means for securing said cassette-receiving means in said first position before said cassette is inserted into said player and adapted to be thereafter responsive to said manually actuable means for ejecting said cassette and returning said receiving means to said first position, and electromechanical means intercoupling said manually actuable means and said linkage and responsive to movement of said manually actuable means, said linkage engageable with said receiving means.

11. A device as set forth in claim 10 wherein said linkage includes operatively interengageable levers with one operatively interengaging a solenoid and said receiving means for moving said receiving means, said other lever engageable with said one lever to lock said one lever while said receiving means is in said first position until a cassette is positioned in said first position.

* * * * *